US008649908B2

(12) United States Patent
Nibler et al.

(10) Patent No.: US 8,649,908 B2
(45) Date of Patent: Feb. 11, 2014

(54) POOL OR SPA EQUIPMENT CONTROL SYSTEM AND METHOD WITH AUTOMATIC ADJUSTMENT (75) Inventors: David B. Nibler, Sonoma, CA (US); Edward Feten, Camarillo, CA (US)

(73) Assignee: Zodiac Pool Systems, Inc., Vista, CA (US)

( * ) Notice: Subject to any disclaimer, the term of this patent is extended or adjusted under 35 U.S.C. 154(b) by 24 days.

(21) Appl. No.: 13/430,623

(22) Filed: Mar. 26, 2012

(65) Prior Publication Data

US 2012/0283853 A1 Nov. 8, 2012

Related U.S. Application Data

(63) Continuation of application No. 12/340,458, filed on Dec. 19, 2008, now Pat. No. 8,145,357.

(60) Provisional application No. 61/015,562, filed on Dec. 20, 2007.

(51) Int. Cl.
*G06F 19/00* (2011.01)
*G05B 11/01* (2006.01)

(52) U.S. Cl.
USPC .............. 700/282; 700/19; 700/20; 700/278; 700/283

(58) Field of Classification Search
USPC ..................... 700/19–20, 276–278, 282–284; 340/505, 540
See application file for complete search history.

(56) References Cited

U.S. PATENT DOCUMENTS

| 4,023,043 | A | | 5/1977 | Stevenson |
| 4,129,493 | A | * | 12/1978 | Tighe et al. ................ 204/229.7 |
| 4,279,012 | A | | 7/1981 | Beckedorff et al. |
| 4,361,274 | A | | 11/1982 | Raleigh et al. |
| 4,368,549 | A | | 1/1983 | Ramey |

(Continued)

FOREIGN PATENT DOCUMENTS

| WO | 2007050175 | 5/2007 |
| WO | 2007058808 | 5/2007 |
| WO | 2009086274 | 7/2009 |

OTHER PUBLICATIONS

Innovative Pool Products LLC, Product Description of Smart Touch 840PowerLine Touch Screen—Black (SKU ST-840Pb), http://www.innovativepools.com/ ,Detail.tpl?rnd=616&cart=9C86BF4D-BD9C-4B3B-8A46-08B9815FDCBA&sku=ST-840Pb, known at least as early as Dec. 3, 2008, 1 page.

(Continued)

*Primary Examiner* — Ramesh Patel
(74) *Attorney, Agent, or Firm* — Dean W. Russell; Kilpatrick Townsend & Stockton LLP (57) ABSTRACT

Automatic adjustment of the control and operation of pool or spa equipment is made based upon a time of year, a geographic location, or both. A controller receives input of the time of year or the geographic location of the pool or spa equipment, or both. The controller then automatically adjusts one or more functions of the pool or spa equipment based upon operational information associated with the time of year and/or geographic location. A user interface connected with the controller may be also used to select a mode of operation, input time or geographic location information, and/or adjust various parameters affecting the automatic seasonal or geographic adjustment of the pool or spa equipment.

28 Claims, 5 Drawing Sheets

(56) References Cited

U.S. PATENT DOCUMENTS

| | | | |
|---|---|---|---|
| 4,369,549 A * | 1/1983 | Sanders | 19/145.7 |
| 4,381,240 A | 4/1983 | Russell | |
| 4,393,527 A * | 7/1983 | Ramey | 4/493 |
| 4,421,270 A | 12/1983 | Raleigh et al. | |
| 4,445,238 A | 5/1984 | Maxhimer | |
| 4,470,541 A | 9/1984 | Raleigh | |
| 4,616,178 A | 10/1986 | Thornton et al. | |
| 4,663,613 A | 5/1987 | Raleigh et al. | |
| 4,724,059 A | 2/1988 | Collier | |
| 4,808,290 A | 2/1989 | Hilbig | |
| 4,830,757 A * | 5/1989 | Lynch et al. | 210/742 |
| 4,857,759 A | 8/1989 | Murphy et al. | |
| 4,951,029 A | 8/1990 | Severson | |
| 5,089,814 A | 2/1992 | DeLuca et al. | |
| 5,114,233 A * | 5/1992 | Clark et al. | 356/496 |
| 5,117,233 A | 5/1992 | Hamos et al. | |
| 5,152,596 A | 10/1992 | Raleigh | |
| 5,221,444 A | 6/1993 | Silveri | |
| 5,221,451 A * | 6/1993 | Seneff et al. | 204/228.3 |
| 5,230,785 A | 7/1993 | Yager | |
| 5,278,455 A | 1/1994 | Hamos | |
| 5,314,589 A | 5/1994 | Hawley | |
| 5,344,068 A | 9/1994 | Haessig | |
| 5,400,246 A | 3/1995 | Wilson et al. | |
| 5,422,014 A * | 6/1995 | Allen et al. | 210/743 |
| 5,545,310 A | 8/1996 | Silveri | |
| 5,602,728 A | 2/1997 | Madden | |
| 5,616,239 A * | 4/1997 | Wendell et al. | 210/86 |
| 5,676,805 A | 10/1997 | Silveri | |
| 5,730,861 A | 3/1998 | Sterghos | |
| 5,752,282 A | 5/1998 | Silveri | |
| 5,759,384 A | 6/1998 | Silveri | |
| 5,885,426 A | 3/1999 | Silveri | |
| 5,902,183 A | 5/1999 | D'Souza | |
| 6,007,693 A | 12/1999 | Silveri | |
| D427,155 S | 6/2000 | Maskell | |
| 6,125,481 A * | 10/2000 | Sicilano | 4/509 |
| 6,235,188 B1 | 5/2001 | Nakamura et al. | |
| 6,238,555 B1 | 5/2001 | Silveri et al. | |
| D443,595 S | 6/2001 | Pawley | |
| 6,309,538 B1 | 10/2001 | Khan | |
| 6,310,547 B1 | 10/2001 | Parker | |
| 6,340,431 B2 | 1/2002 | Khan | |
| 6,407,469 B1 | 6/2002 | Cline et al. | |
| 6,553,336 B1 | 4/2003 | Johnson et al. | |
| 6,568,264 B2 | 5/2003 | Heger | |
| 6,600,971 B1 | 7/2003 | Smith et al. | |
| 6,627,053 B2 | 9/2003 | Hirota et al. | |
| 6,676,831 B2 | 1/2004 | Wolfe | |
| 6,747,367 B2 | 6/2004 | Cline et al. | |
| 6,782,309 B2 | 8/2004 | Laflamme et al. | |
| 6,814,858 B2 | 11/2004 | Yamamoto et al. | |
| 6,857,967 B2 | 2/2005 | Loyd et al. | |
| 6,861,494 B2 * | 3/2005 | Debruin | 528/272 |
| 6,898,467 B1 | 5/2005 | Smith et al. | |
| 7,008,529 B2 | 3/2006 | Nakanishi et al. | |
| 7,113,852 B2 | 9/2006 | Kapadia et al. | |
| 7,130,720 B2 | 10/2006 | Fisher | |
| 7,158,909 B2 | 1/2007 | Tarpo et al. | |
| 7,167,087 B2 | 1/2007 | Corrington et al. | |
| 7,172,366 B1 | 2/2007 | Bishop, Jr. | |
| 7,292,898 B2 | 11/2007 | Clark et al. | |
| 7,318,344 B2 | 1/2008 | Heger | |
| 7,397,360 B2 | 7/2008 | Corrington et al. | |
| 7,398,138 B2 * | 7/2008 | Emery et al. | 700/283 |
| 7,402,252 B2 | 7/2008 | Kadlec et al. | |
| 7,440,864 B2 | 10/2008 | Otto | |
| 7,489,986 B1 | 2/2009 | Laflamme et al. | |
| 7,640,079 B2 | 12/2009 | Nickerson et al. | |
| 7,658,834 B2 | 2/2010 | Salerno | |
| 7,695,613 B2 | 4/2010 | Doyle et al. | |
| 8,145,357 B2 * | 3/2012 | Nibler et al. | 700/276 |
| 2002/0035403 A1 * | 3/2002 | Clark et al. | 700/65 |
| 2002/0082727 A1 * | 6/2002 | Laflamme et al. | 700/65 |
| 2003/0034898 A1 | 2/2003 | Shamoon et al. | |
| 2003/0200009 A1 | 10/2003 | von Kannewurff et al. | |
| 2004/0003051 A1 | 1/2004 | Krzyzanowski et al. | |
| 2004/0100394 A1 | 5/2004 | Hitt | |
| 2004/0255375 A1 | 12/2004 | Scarlata | |
| 2004/0260427 A1 | 12/2004 | Wimsatt | |
| 2005/0275626 A1 | 12/2005 | Mueller et al. | |
| 2006/0055513 A1 | 3/2006 | French et al. | |
| 2006/0092008 A1 * | 5/2006 | Corrington et al. | 340/505 |
| 2006/0154642 A1 | 7/2006 | Scannell | |
| 2007/0058313 A1 | 3/2007 | Maddox | |
| 2007/0106403 A1 * | 5/2007 | Emery et al. | 700/90 |
| 2007/0112939 A1 | 5/2007 | Wilson et al. | |
| 2007/0145191 A1 | 6/2007 | Smith et al. | |
| 2007/0192486 A1 | 8/2007 | Wilson et al. | |
| 2007/0251461 A1 | 11/2007 | Reichard et al. | |
| 2008/0021685 A1 * | 1/2008 | Emery et al. | 703/9 |
| 2008/0039977 A1 | 2/2008 | Clark et al. | |
| 2008/0147205 A1 | 6/2008 | Ollis et al. | |
| 2008/0167756 A1 | 7/2008 | Golden et al. | |
| 2008/0183049 A1 | 7/2008 | Karkanias et al. | |
| 2008/0183307 A1 | 7/2008 | Clayton et al. | |
| 2008/0258907 A1 | 10/2008 | Kalpaxis | |
| 2008/0311898 A1 | 12/2008 | Benco et al. | |
| 2009/0038696 A1 | 2/2009 | Levin et al. | |
| 2009/0138099 A1 | 5/2009 | Veillette | |
| 2009/0138131 A1 | 5/2009 | Uy | |
| 2009/0164049 A1 | 6/2009 | Nibler et al. | |
| 2009/0211919 A1 | 8/2009 | Hegel et al. | |
| 2009/0243852 A1 | 10/2009 | Haupt et al. | |
| 2009/0271002 A1 | 10/2009 | Asofsky | |
| 2009/0316671 A1 | 12/2009 | Rolf et al. | |
| 2010/0030389 A1 | 2/2010 | Palmer et al. | |
| 2010/0187185 A1 | 7/2010 | Johnson et al. | |
| 2010/0230365 A1 | 9/2010 | Hill et al. | |
| 2010/0250449 A1 | 9/2010 | Doyle et al. | |

OTHER PUBLICATIONS

Innovative Pool Products LLC, Product Description of Smart Touch 840PowerLine Touch Screen—White (SKU ST-840Pw), http://www.innovativepools.com/ ,Detail.tpl?rnd=783&cart=9C86BF4D-BD9C-4B3B-8A46-08B9815FDCBA&sku=ST-840Pw, known at least as early as Dec. 3, 2008, 1 page.

Jandy 2007 Catalog, Control Accessories, Jandy Pool Products, Inc., 13 pages.

Jandy 2007 Catalog, Control Finished Goods, Jandy Pool Products, Inc., 13 pages.

Jandy 2008 Catalog, Control Accessories, Jandy Pool Products, Inc., 13 pages.

Jandy 2008 Catalog, Control Finished Goods Jandy Pool Products, Inc., 13 pages.

Pentair Water Pool and Spa, IntelliTouch® Systems Features, Products and. Product Descriptions,http://www.pentairpool.com/pool-pro/products/automation- ,intellitouch-systems-79.html, known at least as early as Dec. 3, 2008, 2 pages.

Jandy 2007 Catalog, Control Parts, Jandy Pool Products, Inc., 20 pages.

Jandy 2008 Catalog, Control Parts, Jandy Pool Products, Inc., 21 pages.

Jandy 2007 Catalog, Control Selection Guide, Jandy Pool Products, Inc., 6 pages.

Jandy 2008 Catalog, Control Selection Guide, Jandy Pool Products, Inc., 6 pages.

RTA300 Series ADSL Router User's Manual,, Nov. 7, 2002, 86 pages.

Total Pool Management, Goldline Controls, http://www.zinasunshine.com/pdfs/Goldline_Total_Controls.pdf 2008, 4 pages.

Installation Guide: Delta T Pro Control Units Wifi + Ethernet, Heliodyne Solar Hot Water http://www.heliodyne.com/products_systems/control_units/DeltaT_Pro.pdf, known as early as Jan. 28, 2011, 20 pages.

Message Master 4000, Picobox, http://www.picobox.biz/images/brochures/MM4K.pdf, known as early as Jan. 28, 2011, 4 pages.

(56) References Cited

OTHER PUBLICATIONS

Strantrol Automated Pool & Spa Control Systems, Siemens, http://www.water.siemens.com/SiteColiectionDocuments/Product_Lines/Stranco_Products/Brochures/Strantrol%20Aquatic%20Brochure%20Low%20Res.pdf, known as early as Jan. 28, 2011, 8 pages.
Wallace & Tiernan Data Management ChemWeb-Server, Siemens, http://www.industrysolutions.siemens.com/pma/_resources/media/pdf_broch/process_drinking _water/6MFC_SFC/chemweb-server.pdf, 2008, 4 pages.
WebIO Controller WEC1, WEC2 and WEC3, Picobox, http://www.linkwisetech.com/Product_Picobox_WEC.html, Sep. 3, 2010, 3 pages.
Akyildiz et al., "Wireless Sensor Networks: A Survey Revisted.", Computer Networks Journal, 2005.
Akyildiz et al., "Wireless Sensor Networks: A Survey.", Computer Networks, vol. 38, 2002, 393-422.
Office Action dated Jan. 22, 2010 in Australian Patent Application No. 2008261166, 2 pages.
Office Action dated May 16, 2011 in Australian Patent Application No. 2008261166, 2 pages.
Office Action dated Feb. 11, 2011 in Australian Patent Application No. 2008261166, 3 pages.
Response dated Jan. 21, 2011 in Australian Patent Application No. 2008261166, 8 pages.
Office Action dated Sep. 21, 2011 in Canadian Patent Application No. 2,647,662, 3 pages.
OSF, "Pool-Control-TOUCH 2", http://www.mepool.com/Files/PC-Touch-2%20englishch.pdf, osf Hansjurgen Meier, Elektrotechnik und Elektronik GmbH & Co. KG, known as early as Jan. 28, 2011, 2 pages.
OSF, "Pool-Control-TOUCH 2", http://www.osf.de/en/index.php?pageid+touch2&menu=1&pages=2, osf Hansjurgen Meier, Elektrotechnik und Elektronik GmbH & Co. KG, 2010, 2 pages.
Author Unknown, Schuco Remote Monitoring System, Schuco, Retrieved From: http://www.schueco.com/web/us/residential/solarheaCsolarpower/products/solar_thermal_systems/Solar_Collectors/Schueco_Remote_Monitoring/9678752/p3496_schuco_remote_monitoring_v1.0, known at least as early as Jan. 28, 2011, 2 pages.
Response to Office Action dated Apr. 22, 2011 in Australian Patent Application No. 2008261166, 13 pages.
Office Action dated Feb. 24, 2011 in U.S. Appl. No. 12/340,458.
Response dated May 24, 2011 in U.S. Appl. No. 12/340,458.
Office Action dated Jul. 26, 2011 in U.S. Appl. No. 12/340,458.
Pre-Brief Conference Request dated Sep. 26, 2011 in U.S. Appl. No. 12/340,458.
Pre-Brief Appeal Conference Decision dated Oct. 18, 2011 in U.S. Appl. No. 12/340,458.
Notice of Allowance dated Nov. 18, 2011 in U.S. Appl. No. 12/340,458.
Office Action dated Dec. 3, 2012 in Canadian Application No. 2647662.
Office Action dated Oct. 29, 2013 in Canadian Application No. 2647662.

\* cited by examiner

POOL OR SPA EQUIPMENT CONTROL SYSTEM AND METHOD WITH AUTOMATIC ADJUSTMENT

CROSS REFERENCE TO RELATED APPLICATIONS

This application is a continuation of U.S. patent application Ser. No. 12/340,458 (now U.S. Pat. No. 8,145,357) filed Dec. 19, 2008, which application claims the benefit of priority pursuant to 35 U.S.C. §119(e) of U.S. Provisional Application No. 61/015,562 filed Dec. 20, 2007, which applications are hereby incorporated herein by reference in their entirety.

This application is related to U.S. patent application Ser. No. 12/255,598 filed Oct. 21, 2008, entitled "Residential environmental management control system with sprinkler control module," which is hereby incorporated herein by reference in its entirety. This application is also related to U.S. patent application Ser. No. 12/255,554 filed Oct. 21, 2008, entitled "Residential environmental management control system interlink," which is hereby incorporated herein by reference in its entirety.

TECHNICAL FIELD

The present disclosure relates to environmental management systems and, more specifically, to residential environmental management control systems and automatic adjustment thereof.

BACKGROUND

Commercial and residential environmental management systems and devices are known for controlling pools, spas and associated water features. Other systems and devices are known for separately controlling other residential environmental management systems, such as security systems, outdoor lighting systems, or automatic sprinkler systems. Residential environmental management systems are typically powered systems that include user interfaces that allow a user to program various functions and view system status.

SUMMARY

As described further below, various ways of automatically adjusting residential environmental systems via a residential environmental management control system are contemplated.

In one embodiment, a residential environmental management control system may comprise a controller configured for coupling with a plurality of residential environmental management systems. A user interface may be coupled to the controller and configured to receive user input to select operations of the controller. The controller is configured to automatically adjust one or more residential environmental management systems coupled thereto based on a time of year. The time of year may be, for example, a monthly basis for adjustment, a daily basis for adjustment, and/or a specific date basis for adjustment.

In another embodiment, the controller may be configured to automatically adjust the residential environmental management systems based on a geographic location of the residential environmental management systems. A location identifier, for example, a city or a zip code associated with the location where the system is installed, may be preset or entered via the user interface. The location identifier may determine one or more automatic adjustment programs for the controller to implement as a default for the installation location, for example, to take into account the seasonal changes that occur for that location.

In various embodiments, methods of operating a residential environmental management control system including a controller to automatically adjust at least one residential environmental management system coupled thereto are described. Such methods may involve automatically adjusting control of the residential environmental management systems implemented by the controller based on a time of year, a geographic location, or a combination thereof. The time of year may be a monthly basis for adjustment, a daily basis for adjustment and/or a specific date basis for adjustment.

While various features are disclosed, still other embodiments of the present disclosure will become apparent to those skilled in the art from the following Detailed Description, which shows and describes an illustrative embodiment of the invention. As will be realized, the present disclosure is capable of modifications in various aspects, all without departing from the spirit and scope of the present disclosure. Accordingly, the drawings and detailed description are to be regarded as illustrative in nature and not restrictive.

DETAILED DESCRIPTION

In general, a residential environmental management control system may comprise a controller, which may be configured for coupling to various other systems and/or devices to control such systems and/or devices. For example, the controller may include a plurality of outputs, via which control signals and/or programming instructions may be provided to connected systems. The controlled systems and/or devices may include various pool and/or spa systems (e.g., water fill, water heaters, filter cycles), underwater pool lights, fountains, sprinkler systems, outdoor lighting systems, security systems, and the like, or devices related to such systems. In other words, the residential environmental management control system may be configured to control any system or device related to a residential environment.

Although such a residential environmental management control system is typically configured to be programmed by a user to control the various systems coupled thereto as desired, it may be desirable to provide automatic adjustment of the control implemented by the controller for one or more of the coupled systems. For example, seasonal changes for a particular location may vary the requirements for certain residential environmental management systems. Such seasonal changes may be taken into account by automatic adjustment of the operations implemented by the controller.

For example, the use of a pool may be limited to a "pool season" that may run, for example, from May to September based on local climate (e.g., average daily temperature). The use of the pool may gradually increase and peak during the warmest month(s), and then decrease toward the end of the pool season. Operation of the residential environmental management systems associated with the pool, for example, a filtration pump, a pool cleaner, a chlorinator, underwater lighting, an automated pool or spa cover, and a pool fountain, may be conveniently and efficiently managed by automatically adjusting their operation throughout the pool season, without frequent user interaction that might otherwise be required.

Other automatic adjustments are described herein and still further automatic adjustments not explicitly described may be envisioned. It should be understood that the automatic adjustment described herein is based on a time of year and is distinct from programmed on/off times automation and systems that adjust operations based on sensors or indicators of environmental conditions. Thus, the automatic adjustments described herein are not subject to the variability of sensors, which may be covered or otherwise interfered with, may be inaccurate, and/or may fail for one reason or another.

Figure 1:
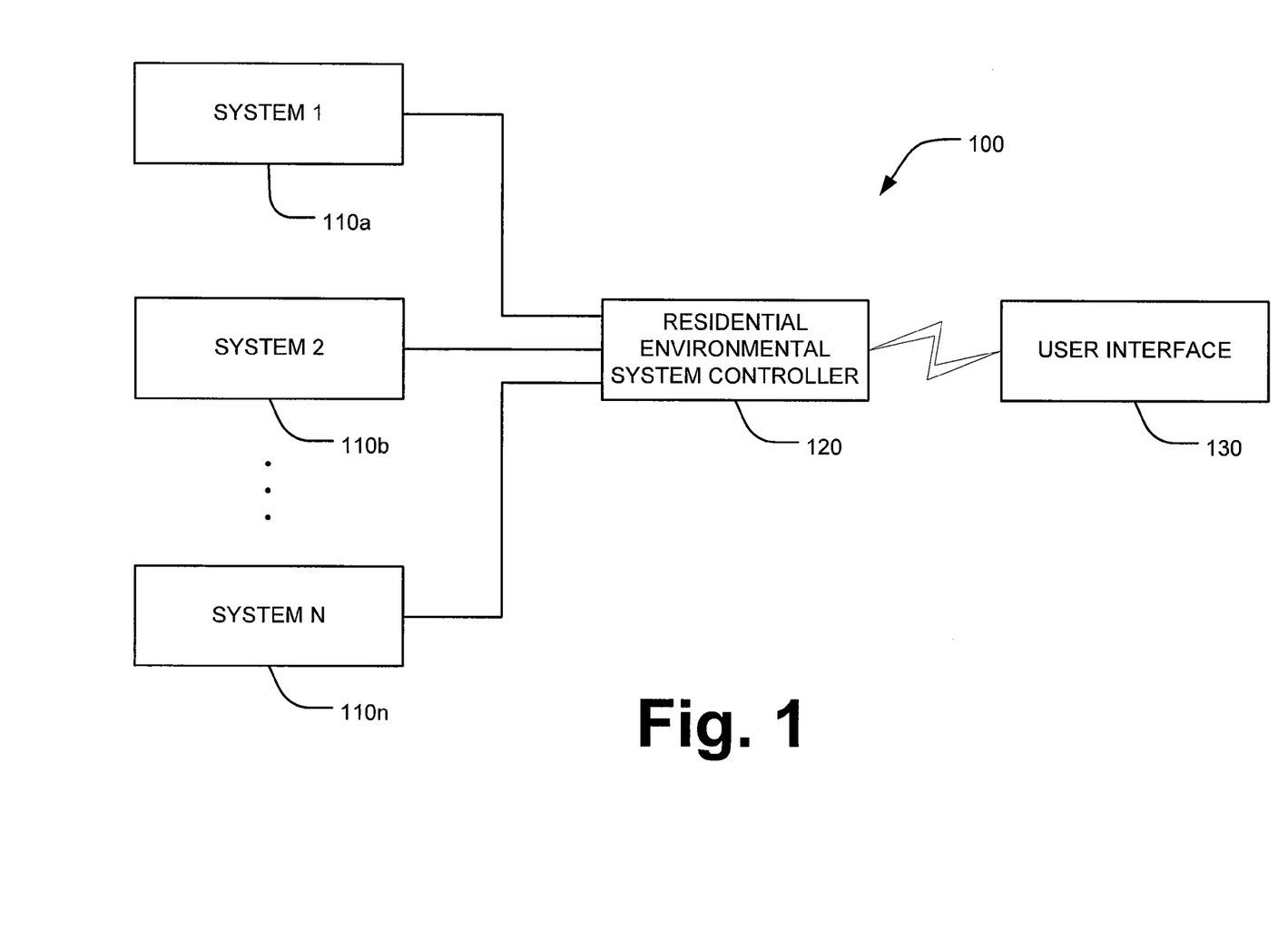
FIG. 1 is a block diagram depicting an installation of a plurality of residential environmental management systems and a residential environmental management control system.

As contemplated in various embodiments and shown in FIG. 1, a system installation 100 may include a plurality of residential environmental management systems 110a, 110b, through 110n. Each of the residential environmental management systems 110a, 110b, through 110n may be coupled or operably connected to a residential environmental management control system or controller 120. The operable connections may be wired or wireless, as appropriate or desired. In some applications, wired connections may be desired for reliability and/or to avoid electrical interference. In other applications, wireless connections may be desired, for example, to avoid complex or undesirable wiring.

The residential environmental management control system 120 may be connected with a user interface 130, which may be configured to allow a user to input commands or program instructions for operating the residential environmental management systems 110a, 110b, through 110n, either individually or in various combinations. The user interface 130 may be a single user interface configured to control or operate the residential environmental management systems 110a, 110b, through 110n. It should be understood that more than one user interface 130 may be employed, for example, as redundant access points for the user, allowing a user interface 130 to be installed at multiple locations as appropriate or desired. However, the installation 100 is configured to provide control or operation of all of the residential environmental management systems 110a, 110b, through 110n via the user interface(s) 130, i.e., via common user interface(s).

Specifically, the controller 120 may include various programs and programmable functions that will control the operations of the various residential environmental management systems 110a, 110b, through 110n. The programmable functions may be programmed and the programs may be set or selected by a user via the user interface 120. For example, various systems associated with pool operation may be envisioned, including, e.g., water fill, a filtration pump, a chlorinator, a heater, and a cleaner. The controller 120 may include programs for each of these systems, for example, that control on/off times, run times, operational levels (e.g., speed, power, or production/concentration), or other parameters of the particular systems. The programs may include automatic adjustment of the operating parameters of the systems so that the time of year and/or geography may be taken into account.

With respect to the automatic adjustment contemplated herein, the controller 120 may include a plurality of modes that may be selected via the user interface 130. For example, the controller 120 may include a "summer season" or "pool season" mode and a "winter season" mode that may be selected. The user may select the appropriate mode and allow the controller 120 to implement programs associated with the selected mode to operate the residential environmental management systems 110a, 110b, through 110n with or without further user input. Thus, the modes may define groups of programs that control various systems and/or devices of such systems. The "pool season" mode may be programmed by the user to start and end at a particular time of year so as to switch between modes automatically. Alternatively, the user may manually turn on/off the modes as desired.

The modes may be configured to provide macro changes in the control of the various systems. For example, the modes may turn on or off entire systems and/or subsystems and provide default values for the programs that control the various systems. For each system and/or device that is controlled by programs implemented in a particular mode, micro changes may be included in the default values to provide automatic adjustment within the mode and/or a user may be allowed to input alternative values for the default values and/or the micro changes.

Thus, macro changes in the control of systems and devices may be provided by switching between modes, for example, on particular dates. For example, the controller 120 may be set to enter the "pool season" mode on May 17 and to enter the "winter" mode on September 8. Then, within the duration of each mode, automatic control and micro adjustment of various systems and devices may occur, based on default values and/or user set values. It should be understood that the number and character of the plurality of modes may vary depending on the particular application, such as geographic location and/or types of residential environmental management systems 110a, 110b, through 110n being controlled.

For example, systems associated with pool operation may be adjusted monthly during the pool season to account for increased pool use. As the average daily temperature increases, pool use may increase and require increased operation or performance from the associated systems. To respond to such conditions, the controller 120 may include default values for adjusting the operating parameters of the various systems. The amount of adjustment, however, may be set by the user via the user interface 130, as appropriate or desired. For example, a filtration pump may have a default value of one hour adjustment in operating time, and may include a range of adjustments in half or quarter hour increments between 0.5 and 2.0 hours. Similarly, a chlorinator may have a default value of 15 percent adjustment in concentration level, and may include a range of adjustments in one or five percent increments between 10 and 20 percent. It should be understood that these are only examples and that the default adjustment values and the range of adjustments available to the user may vary as appropriate or desired based upon, e.g., the particular systems employed, regulations, or other requirements imposed.

Figure 2A:
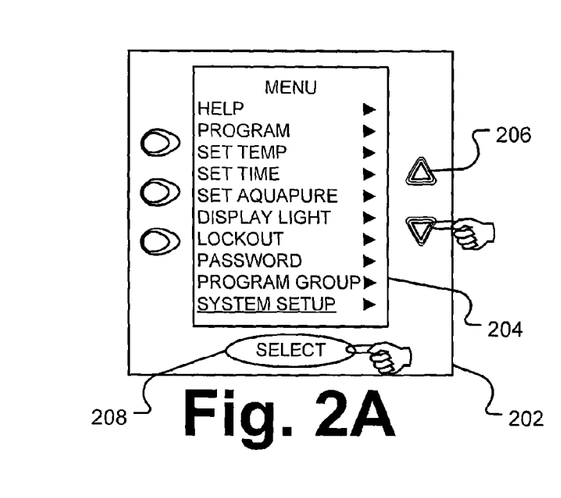
FIGS. 2A-E are illustrations of a series of screens that may be presented by the user interface of the residential environmental management control system during setting of an automatic adjustment program.
Figure 2B:
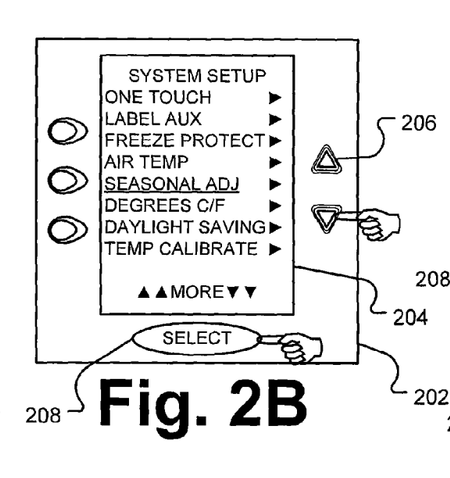
Figure 2C:
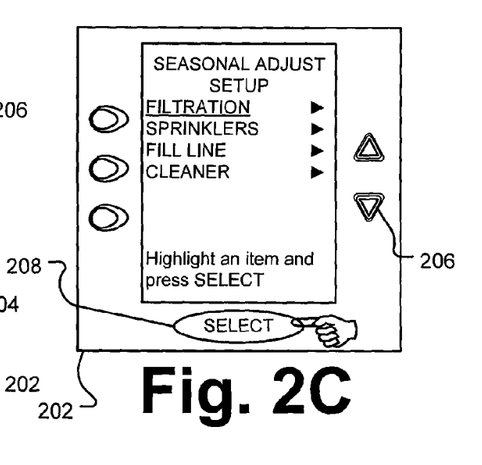

As illustrated in FIGS. 2A-E in an exemplary control environment, the user may interact with the user interface 202 to input parameters for the automatic adjustment of the operations to be implemented by the controller. In this illustration, the controller is interfacing with a pool system and is assumed to have a "pool season" mode and a "winter season" mode, and the "winter season" mode is assumed to have no user programmable automatic adjustment. In FIG. 2A, the user may select "SYSTEM SETUP" from a main menu displayed on a screen 204 of the user interface 202. The user may scroll through a resulting setup menu to locate and select "SEASONAL ADJ" using the input buttons 206 as shown in FIG. 2B. The resulting seasonal adjust setup menu shown on the display screen 204 of the user interface 202 in FIG. 2C may list all of the residential environment management systems coupled to the controller, only those systems associated with the "pool season" mode, or only those systems that include an automatic adjustment that may be modified by the user.

Figure 2D:
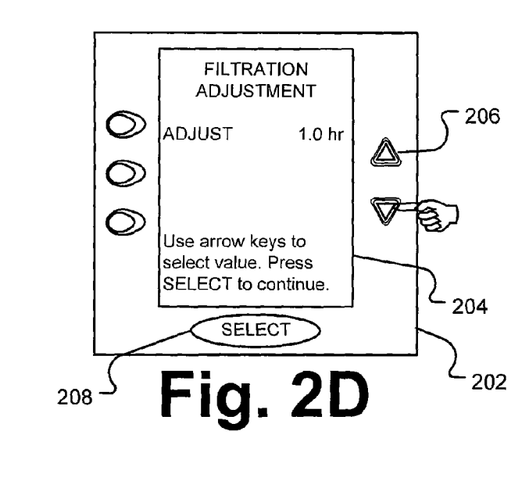
Figure 2E:
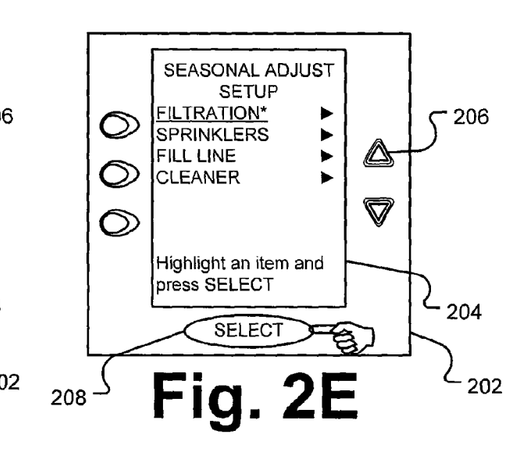

Selecting one of the systems, such as "FILTRATION," listed in the seasonal adjust setup menu by depression of the "SELECT" button 208 may display a screen 204 indicating the default or current values for adjustment(s) associated with the selected system, as shown in FIG. 2D. The user may adjust the value(s) up or down by using the input buttons 206 on the user interface 202. Once the adjustment value has been set, the user interface 202 may indicate that the seasonal adjust feature for the particular system has been set or modified from the default, for example, as indicated by the asterisk mark (*) next to the "FILTRATION" selection as shown in FIG. 2E.

It should be understood that the user may be able to selectively activate the seasonal adjustment for each of the systems. However, it may be more convenient to have the seasonal adjustment be active automatically without selection or adjustment or upon selection/activation of the "pool season" mode with only a change in default adjustment values requiring user interaction.

For example, once the "FILTRATION" adjustment value has been set to one hour as shown in FIGS. 2A-2E, the controller may automatically adjust the time of operation of the filtration pump. As either set by the user or as a default, the filtration pump may be controlled to operate from 8:00 a.m. to 4:00 p.m. starting in the month of March. The controller 210 may adjust the operation so that filtration pump may be controlled to operate from 8:00 a.m. to 5:00 p.m. starting in the month of May, adding an hour to the operation time. The controller 210 may adjust the operation so that filtration pump may be controlled to operate from 8:00 a.m. to 6:00 p.m. starting in the month of July, adding another hour to the operation time. The controller 210 may adjust the operation so that filtration pump may be controlled to operate from 8:00 a.m. to 5:00 p.m. starting in the month of September, subtracting an hour from the operation time. The controller 210 may adjust the operation so that filtration pump may be controlled to operate from 8:00 a.m. to 4:00 p.m. starting in the month of October, subtracting another hour from the operation time. The controller 210 may adjust the operation so that filtration pump may be controlled to operate from 8:00 a.m. to 3:00 p.m. starting in the month of December, subtracting another hour from the operation time. The controller 210 may adjust the operation so that filtration pump may be controlled to operate from 8:00 a.m. to 4:00 p.m. starting in the month of March, adding an hour to the operation time.

It should be noted that this example assumes that the "pool season" mode is set for year-round operation. Further, it should be understood that the adjustments may be made daily, weekly, monthly, bi-monthly or only in selected or predetermined months or other time periods. Also, as appropriate or desired, adjustments may be made on specific dates. Thus, by automatic adjustment based on time of year, it is contemplated that seasonal changes may be accounted for automatically.

Similarly, automatic adjustment of other residential environmental systems may be provided. For example, if a lighting system is to be turned on at dusk every day and turned off at dawn every day, the user need not adjust the on and off times throughout the year. Instead, the user may set an on time and an off time once and have the controller adjust the on and off times as the days lengthen and shorten. For example, the controller may access a lookup table of values corresponding to known sunrise and sunset times for the user's location to adjust the on and off times as the year progresses. Alternatively or additionally, the controller may perform a suitable calculation or run an algorithm that computes an appropriate adjustment, either daily, weekly, monthly, or otherwise, as appropriate or desired. The lookup table and/or calculations may be based upon the geographic location of the overall system. Various parameters may be adjusted other than on/off and run time. As discussed above, different operational levels, for example, run frequency, speed, power, concentration, and others, may be adjusted.

Alternatively or additionally to user setting of adjustment values as described above, a location identifier or geographical location, such as time zone, city, or zip code, may be input to identify the location of the installation of the systems to be controlled. This may be done at the factory, by an installer, or by the user. If the controller is connected with a communication network (e.g., the Internet), the controller may identify its location or use input location identification information to access a lookup table data from a data store accessible over the communication network. The location identifier may establish default values for various parameters, including, but not limited to, start and stop times for operational modes of the controller, parameters for operations of particular systems to be controlled, default adjustment values, and others. Thus, the controller may be configured specifically for the geographic location of the controller and controlled systems.

In particular, when the controller is provided with the geographic location, automatic adjustments may be made without any (or limited) user interaction. For example, a sprinkler system coupled to the controller may be operated only during a growing season for the geographic location, may be adjusted for rainy and/or dry seasons, may be adjusted based on evaporation rates, may be adjusted to comply with water use restrictions, may be adjusted to introduce a liquid fertilizer at appropriate times, or for other reasons. Water fill lines may be similarly adjusted for various systems, such as pools, spas, fountains, and the like. It should be understood that sprinkler systems and/or water supply systems may operate similar to the filtration example discussed above, to supply a desired amount of water per month, week, day or other period.

Figure 3:
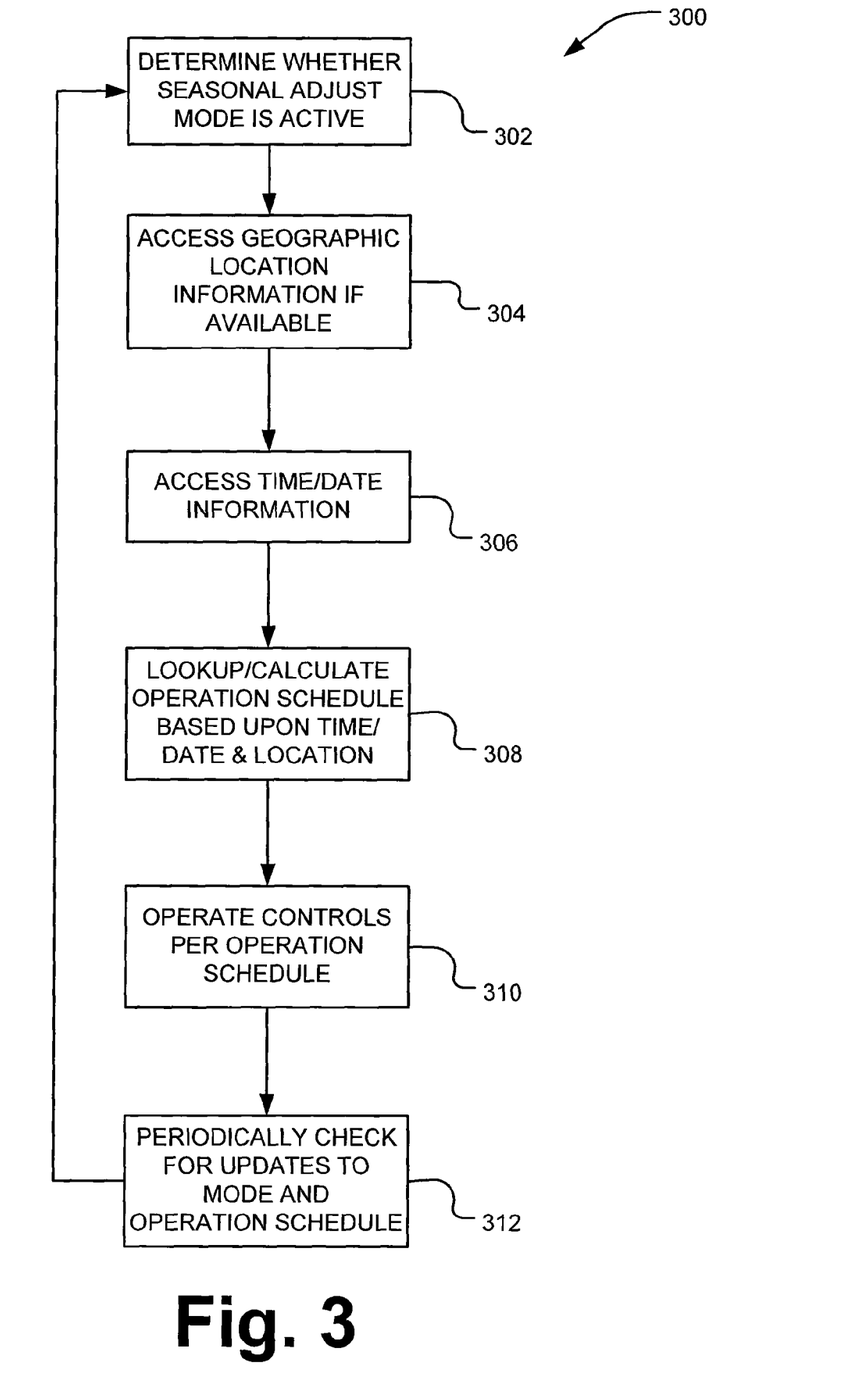
FIG. 3 is a flow diagram illustrating an exemplary method for adjusting control settings for a residential environmental management control system based upon time of year and/or geographic location information.

FIG. 3 is a flow diagram depicting an exemplary method 300 for implementing a seasonal adjustment functionality to a residential environmental control system. In an initial determination operation 302, the method 300 determines whether the seasonal adjust mode is active on the controller with respect to a particular environmental control system. If the seasonal adjust mode is active, the method 300 may then access relevant geographic location information, if available, in accessing operation 304. Geographic location information may be input directly into the system by a user or system installer through a user interface in a software configuration operation. The geographic location information may be as simple as the input of a zip code of the residential environmental control system into an interface unit of the control system.

Alternatively, if the controller is connected with a communication network, e.g., the Internet, then the controller may seek the geographic location information over the network, e.g., by determining the geographic location of the closest Internet service provider gateway. In other implementations, the controller may be equipped with global positioning system (GPS) hardware and receive geographic location coordinates from the GPS system. In yet another implementation, if a mobile communication network is accessed by the controller, it may be possible for the controller to triangulate its geographic position if equipped with the appropriate calculation software.

Similarly, the controller may access time and date information in order to assist in any seasonal adjustment determination or calculation as indicated in accessing operation 306. The time and date information may be set by the user or system installer and kept in an internal clock under control of the controller. Alternatively, if the controller is connected with a communication network, the controller may access time and date information from an outside source via the Internet to either set or synchronize an internal clock. The controller may alternatively access the network clock source on a regular basis to collect the time and date information whenever needed to perform an adjustment lookup or calculation.

Next the controller actually performs a lookup and/or calculation of an operation schedule or change thereto based upon the time and date information, the geographic location information, or a combination of both as indicated in operation 308. Operation schedule adjustment information may be stored in a lookup table in local memory on the controller or accessed from a remote memory storage via the communication network. The operation schedule data may be a complete schedule of default operational times and/or control functions designed for optimum performance for the particular geographic region, time of day, and/or date. Alternatively, the operation schedule data may be numeric values for input into calculations performed by the controller to output an optimized control schedule.

The controller may then operate the residential environmental system according to the returned or calculated operation schedule as indicated in operation 410. The controller may further periodically check for updates to the mode to determine whether the seasonal adjust mode is still activated and to confirm or synchronize the time and date or geographic location information to ensure that the operation schedule is accurate.

Figure 4:
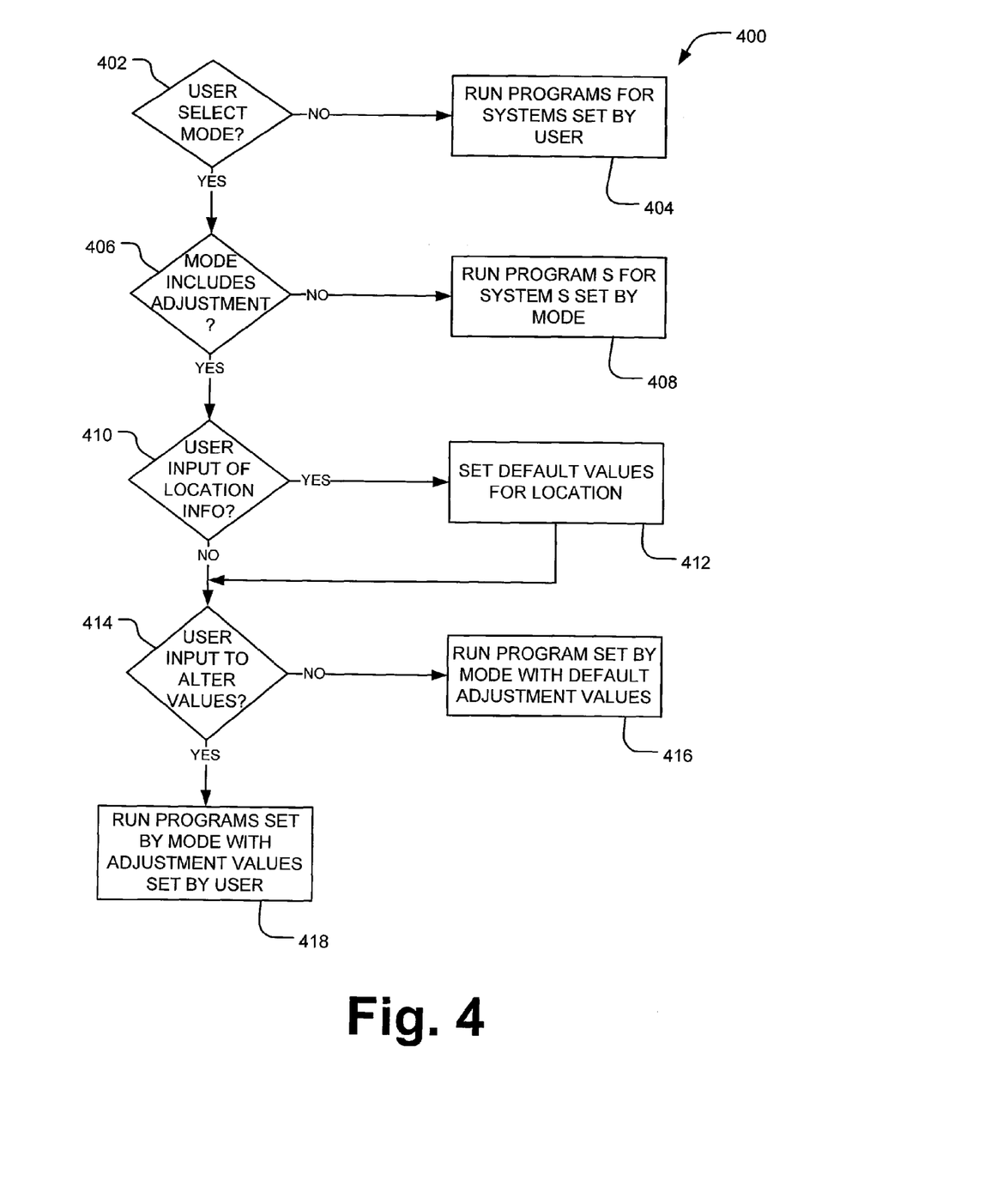
FIG. 4 is a flow chart illustrating an exemplary method of operating a residential environmental management control system to set and/or implement automatic adjustment of a residential environmental management system coupled thereto.

FIG. 4 is a flow diagram illustrating an exemplary method 400 of operating a residential environmental management control system to set and/or implement automatic adjustment of a residential environmental management system coupled thereto. In operation 402, a user may set or select a mode of the controller. As discussed above, the controller may include a plurality of modes, for example, for different seasons. It is contemplated that the modes of the controller may be preset to control certain systems coupled to the controller. However, it is also contemplated that the user may be able to select which systems the controller will control for a given mode. Further, it should be understood that modes may exist for individual systems or groups of systems such that a user may select a mode for each system or group.

If the user does not select a mode, the controller may be configured to run programs for controlling the systems as set by the user, as shown in operation 404. If the user does select a mode, the mode may or may not include adjustment, as shown in operation 406. If the selected mode does not adjust to seasonal changes, operation 408 occurs to run the programs set by the mode.

However, if the selected mode does include adjustment for seasonal changes, then the user may be queried for the geographical location of the overall system, as shown in operation 410. It should be understood that the location information may be preset or may be entered only once by the user and used until changed. If the location information is preset or input by the user, then operation 412 may set the adjustment values to the default values for the particular location.

Next, the user may alter the default adjustment values of the mode or the location in operation 414. If the user does not alter the default adjustment values, operation 416 occurs to run the programs set by the mode with the default adjustment values (either set by the mode or by the location). If the user does alter the default adjustment values, operation 418 occurs to run the programs set by the mode with the adjustment values set by the user.

It should be understood that the user may set the adjustment values once and have the controller run the programs with those values each time the mode is selected, until the used decides to alter the adjustment values again. Alternatively, the user may be prompted to alter the current adjustment values each time the mode is selected.

It should also be understood that the default values set by the location may be updated as appropriate or desired. For example, a software update may include new default values to account for local climate changes or the like. Of course, any suitable manner may be used for such an update, such as wired or wireless transmission or manual input.

Figure 5:
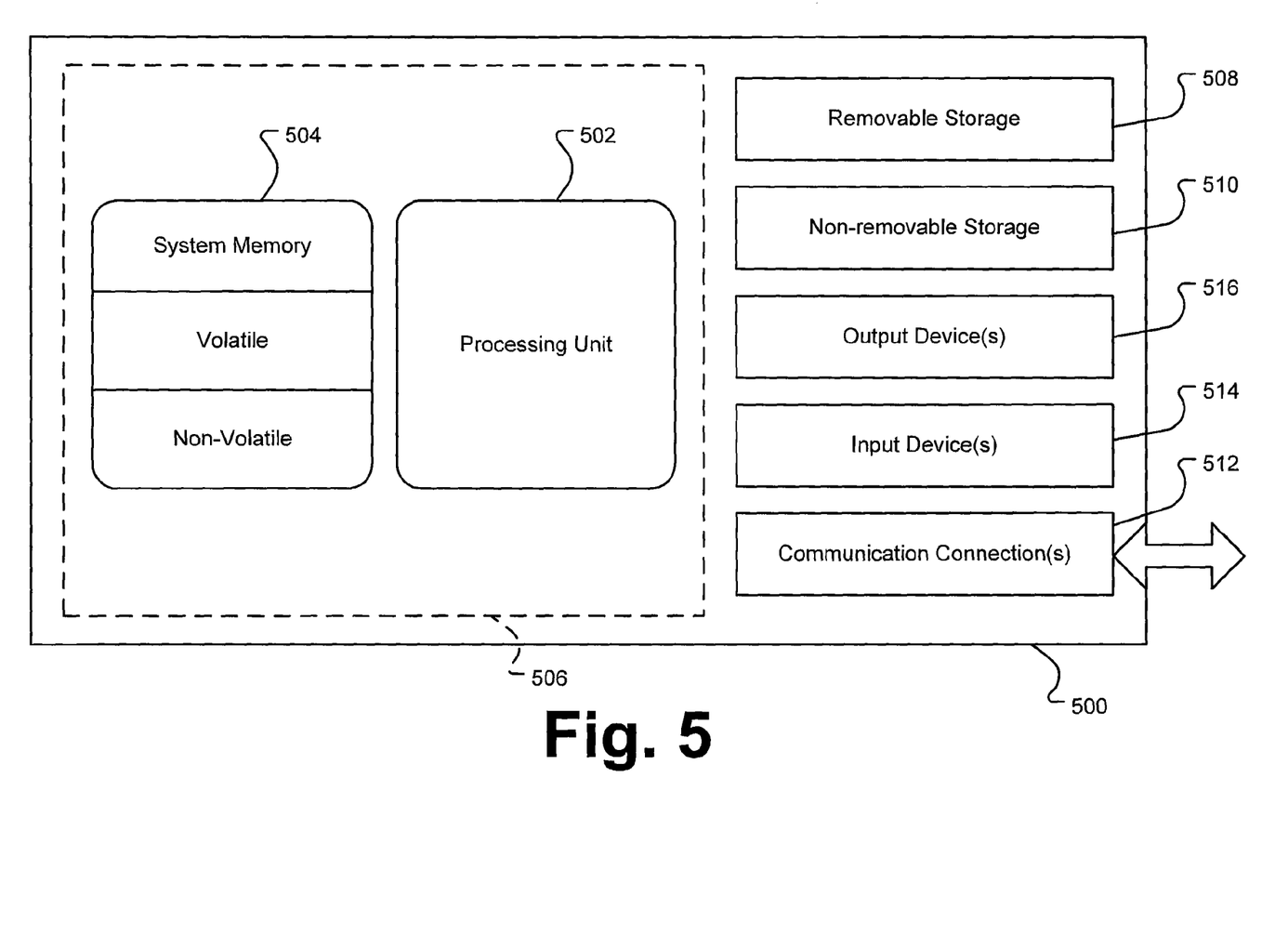
FIG. 5 is a schematic diagram of an exemplary control system for controlling one or more residential environmental management systems.

FIG. 5 illustrates an exemplary controller 500 configured by the user interface device for a residential environmental management systems as described herein. In one implementation, the controller 500 typically includes at least one processing unit 502 and memory 504. Depending upon the exact configuration and type of the controller 500, the memory 504 may be volatile (e.g., RAM), non-volatile (e.g., ROM and flash memory), or some combination of both. The most basic configuration of the controller 500 need include only the processing unit 502 and the memory 504 as indicated by the dashed line 506.

The controller 500 may further include additional devices for memory storage or retrieval. These devices may be removable storage devices 508 or non-removable storage devices 510, for example, memory cards, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 502. Information, for example, lookup tables with seasonal adjustment information and application software, may be stored on the storage device using any method or technology for storage of data, for example, computer readable instructions, data structures, and program modules.

The controller 500 may also have one or more communication interfaces 512 that allow the system 500 to communicate with other devices. The communication interface 512 may be connected with a network. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data is generally transmitted to and from the communication interface 512 over the network via a modulated data signal, e.g., a carrier wave or other transport medium. A modulated data signal is an electromagnetic signal with characteristics that can be set or changed in such a manner as to encode data within the signal.

In some implementations, articles of manufacture are provided as computer program products. One implementation of a computer program product provides a computer program storage medium readable by the controller 500 and encoding a computer program. Another implementation of a computer program product may be provided in a computer data signal embodied in a carrier wave by the controller 500 and encoding the computer program.

The controller 500 may further have a variety of input devices 514 and output devices 516. Exemplary input devices 514 may include a keyboard, a mouse, a tablet, and/or a touch screen device. Exemplary output devices 516 may include a display and speakers. Such input devices 514 and output devices 516 may be integrated with the controller 500 or they may be connected to the controller 500 via wires or wirelessly, e.g., via IEEE 802.11 or Bluetooth protocol. These integrated or peripheral input and output devices are generally well known and are not further discussed herein. Other functions, for example, handling network communication transactions, may be performed by an operating system in the nonvolatile memory 504 of the controller 500.

The implementations described herein may be implemented as logical steps in one or more processing systems. The logical operations of the described systems, apparatus, and methods are implemented (1) as a sequence of processor-implemented steps executing in one or more systems and (2) as interconnected machine modules within one or more systems. The implementation is a matter of choice, dependent on the performance requirements of the control system or device implementing the described system, apparatus, and method. Accordingly, the logical operations making up the implementations of the systems, apparatus, and methods described herein are referred to variously as operations, steps, objects, or modules.

In some implementations, articles of manufacture are provided as computer program products. In one implementation, a computer program product is provided as a computer-readable medium storing an encoded computer program executable by a computer system. Another implementation of a computer program product may be provided in a computer data signal embodied in a carrier wave by a computing system and encoding the computer program. Other implementations are also described and recited herein.

Various methods of automatically adjusting operations of residential environment management systems are contemplated as will be evident from the description provided above. Such methods are not limited to the specific operations and adjustments described, but encompass various other possibilities as would be evident from the functions provided known residential environment management systems.

All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A pool or spa equipment control system comprising
   a controller configured to communicate with pool or spa equipment operational to change a characteristic of water within a pool or spa,
   wherein the controller is configured to automatically adjust a function of the pool or spa equipment with which it communicates based on time of year data, geographic location data, or both.

2. The system of claim 1, wherein the controller is configured to automatically adjust a plurality of functions of the pool or spa equipment with which it communicates based on the time of year data, the geographic location data, or both.

3. The system of claim 1 further comprising a user interface coupled to the controller and configured to receive user input of a location identifier for storage in a memory storage and use by the controller as the geographic location data.

4. The system of claim 3, wherein the location identifier comprises one or more of a geographic location name, a zip code, or a time zone.

5. The system of claim 1 further comprising a user interface coupled to the controller and configured to receive user input of date and time information for storage in a memory storage and for use by the controller as the time of year data.

6. The system of claim 1 further comprising a user interface coupled to the controller and configured to receive user input to manually adjust a parameter of the function.

7. The system of claim 1, wherein
   the controller comprises a memory storage comprising a lookup table of operation schedule information; and
   the controller is further configured to select particular operation schedule information based upon the time of year data, the geographic location data, or both, to automatically adjust the function.

8. The system of claim 1, wherein the controller comprises a memory storage further storing an algorithm which uses the time of year data, the geographic location data, or both, as inputs to the algorithm for use in calculating an adjustment to the function; and
   the controller further performs a calculation using the algorithm, the time of year data, the geographic location data, or both, to automatically adjust the function.

9. The system of claim 1 further comprising
   a communication connection for connecting with a communication network; and wherein
   the controller is configured to access and receive date and time information from a remote source for use by the controller as the time of year data.

10. The system of claim 1 further comprising
a communication connection for connecting with a communication network; and wherein
the controller is configured to access and receive a location identifier from a remote source for use by the controller as the geographic location data.

11. The system of claim 1 further comprising a communication connection for connecting with a communication network, and wherein
the controller is configured to access and receive operation schedule information from a lookup table in a remote storage; and
the controller is further configured to select particular operation schedule information based upon the time of year data, the geographic location data, or both, to automatically adjust the function.

12. The system of claim 1, wherein the controller is configured to adjust the function upon a regular, predetermined period of time.

13. The system of claim 12, wherein the regular, predetermined period of time is one or more of a monthly basis, weekly, or daily basis.

14. The system of claim 1, in which the pool or spa equipment is selected from the group consisting of filtration pumps, pool cleaners, chlorinators, automated pool or spa covers, and pool fountains.

15. The system of claim 14, wherein the controller is configured to automatically adjust a function of a filtration pump with which it communicates based on both of (i) time of year data and (ii) geographic location data.

16. A method of operating a pool or spa equipment control system including a controller, the method comprising
controlling one or more pool or spa water equipment pieces communicating with the controller; and
automatically adjusting a function of at least one of the equipment pieces communicating with the controller based on time of year, geographic location data, or both.

17. The method of claim 16 further comprising
automatically adjusting a plurality of functions of the at least one of the equipment pieces communicating with the controller based on the time of year data, the geographic location data, or both.

18. The method of claim 16 further comprising
receiving user input of a location identifier at a user interface coupled to the controller;
storing the location identifier in a memory storage in the controller for use by the controller as the geographic location data.

19. The method of claim 18, wherein the location identifier comprises one or more of a geographic location name, a zip code, or a time zone.

20. The method of claim 16 further comprising
receiving user input of date and time information at a user interface coupled to the controller;
storing the date and time information in a memory storage in the controller for use by the controller as the time of year data.

21. The method of claim 16 further comprising receiving user input to manually adjust a parameter of the function at a user interface coupled to the controller.

22. The method of claim 16 further comprising selecting particular operation schedule information from a lookup table of operation schedule information in the memory storage based upon the time of year data, the geographic location data, or both, to automatically adjust the function.

23. The method of claim 16 further comprising automatically calculating an adjustment to the function using an algorithm and the time of year data, the geographic location data, or both, as inputs for use in the algorithm.

24. The method of claim 16 further comprising
connecting with a communication network; and
accessing and receiving date and time information from a remote source for use by the controller as the time of year data.

25. The method of claim 16 further comprising
connecting with a communication network; and
accessing and receiving a location identifier from a remote source for use by the controller as the geographic location data.

26. The method of claim 16 further comprising
connecting with a communication network and, wherein
accessing and receiving operation schedule information from a lookup table in a remote storage; and
selecting particular operation schedule information based upon the time of year data, the geographic location data, or both, to automatically adjust the function.

27. The method of claim 16 further comprising adjusting the function upon a regular, predetermined period of time.

28. The method of claim 27, wherein the regular, predetermined period of time is one or more of a monthly basis, weekly, or daily basis.

* * * * *